US012608950B2

(12) United States Patent
Huang

(10) Patent No.: US 12,608,950 B2
(45) Date of Patent: Apr. 21, 2026

(54) SYSTEMS AND METHODS FOR DETECTING OBJECTS BASED ON LIDAR DATA

(71) Applicants: DENSO International America, Inc., Southfield, MI (US); DENSO CORPORATION, Aichi (JP)

(72) Inventor: Minglei Huang, Novi, MI (US)

(73) Assignees: DENSO International America, Inc., Southfield, MI (US); DENSO CORPORATION, Kariya-city (JP)

( * ) Notice: Subject to any disclaimer, the term of this patent is extended or adjusted under 35 U.S.C. 154(b) by 358 days.

(21) Appl. No.: 18/113,785

(22) Filed: Feb. 24, 2023

(65) Prior Publication Data

US 2024/0193959 A1     Jun. 13, 2024

Related U.S. Application Data

(60) Provisional application No. 63/387,154, filed on Dec. 13, 2022.

(51) Int. Cl.
| | |
|---|---|
| *G06V 20/00* | (2022.01) |
| *G06V 10/22* | (2022.01) |
| *G06V 10/764* | (2022.01) |
| *G06V 10/82* | (2022.01) |
| *G06V 20/58* | (2022.01) |

(52) U.S. Cl.
CPC ............ *G06V 20/58* (2022.01); *G06V 10/225* (2022.01); *G06V 10/764* (2022.01); *G06V 10/82* (2022.01)

(58) Field of Classification Search
CPC .... G06V 20/58; G06V 10/225; G06V 10/764; G06V 10/82
See application file for complete search history.

(56) References Cited

U.S. PATENT DOCUMENTS

| | | | |
|---|---|---|---|
| 2018/0348374 A1* | 12/2018 | Laddha | ................. G01S 17/931 |
| 2022/0120858 A1* | 4/2022 | Cennamo | ................ G01S 7/417 |

OTHER PUBLICATIONS

Man et al., Multi-Echo LiDAR for 3D Object Detection, ICCV (Year: 2021).*
Chen et al., PanoNet3D: Combining Semantic and Geometric Understanding for LiDAR Point Cloud Detection, International Conference on 3D Vision (3DV) (Year: 2020).*

(Continued)

*Primary Examiner* — Xiao Liu
(74) *Attorney, Agent, or Firm* — Harness, Dickey & Pierce, P.L.C.

(57) ABSTRACT

A method includes generating a plurality of lidar inputs based on the lidar data and performing, for each lidar input from among the plurality of lidar inputs, a convolutional neural network (CNN) routine to: generate a plurality of bounding boxes based on the lidar inputs, determine one or more dimensional characteristics associated with each of the plurality of bounding boxes, and generate a confidence score associated with each of the plurality of bounding boxes. The method includes selecting one or more target bounding boxes from among the plurality of bounding boxes based on the confidence score associated with each of the plurality of bounding boxes and identifying the one or more objects based on the one or more target bounding boxes.

10 Claims, 5 Drawing Sheets

(56) References Cited

OTHER PUBLICATIONS

Shi et al., PointRCNN: 3D Object Proposal Generation and Detection from Point Cloud, IEEE/CVF Conference on Computer Vision and Pattern Recognition (CVPR) (Year: 2019).*
Lee et al, Parallelization of Non-Maximum Suppression, IEEE Access, vol. 9 (Year: 2021).*
Rezatofighi1 et al, Generalized Intersection over Union: A Metric and A Loss for Bounding Box Regression, CVPR (Year: 2019).*
"Multi-Echo LiDAR for 3D Object Detection," Y. Man, et al., arXiv:2017.11470v1 [cs.CV], Jul. 23, 2021, 14 pages.

* cited by examiner

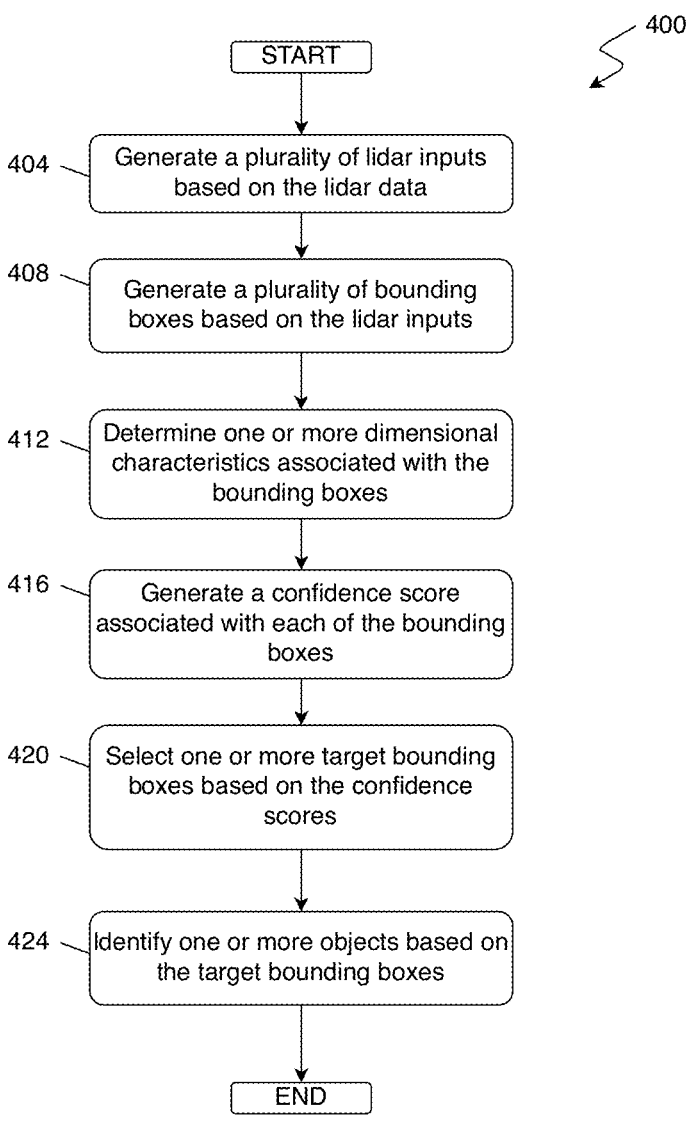

400

START

404 — Generate a plurality of lidar inputs based on the lidar data

408 — Generate a plurality of bounding boxes based on the lidar inputs

412 — Determine one or more dimensional characteristics associated with the bounding boxes 416 — Generate a confidence score associated with each of the bounding boxes 420 — Select one or more target bounding boxes based on the confidence scores 424 — Identify one or more objects based on the target bounding boxes

END

FIG. 4

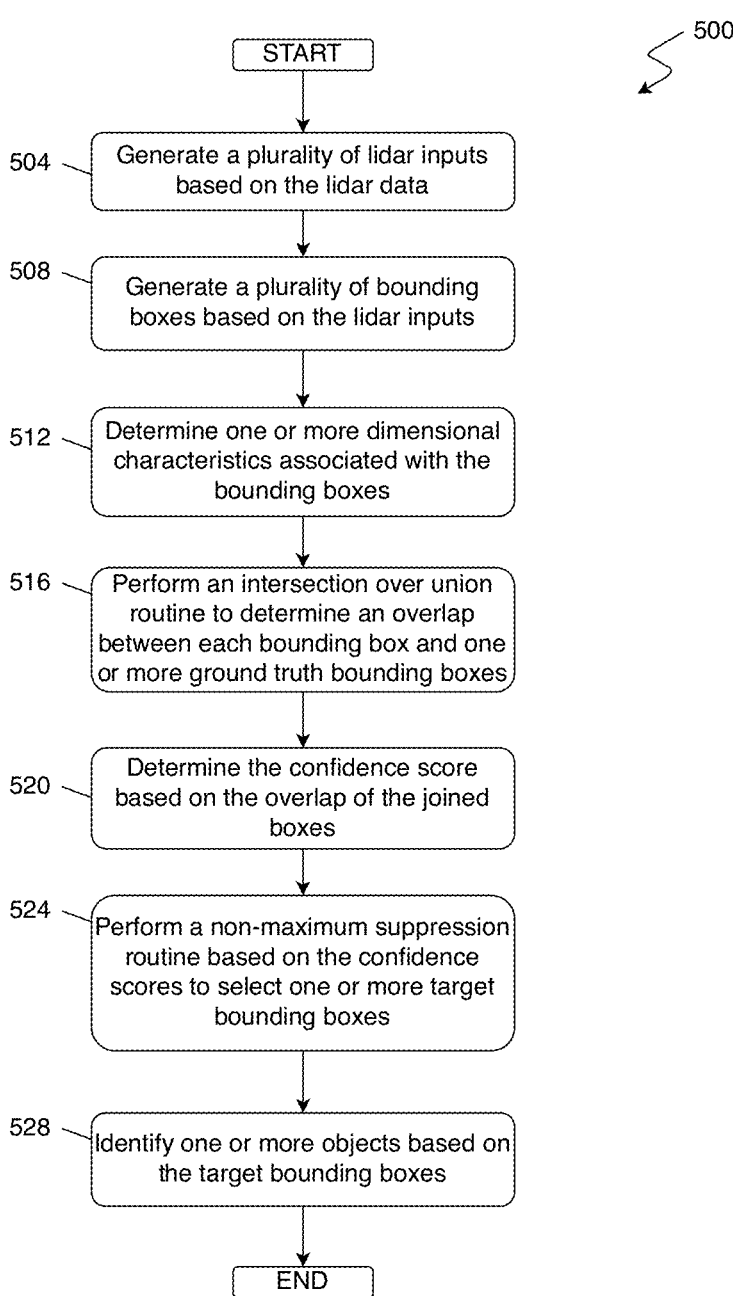

500

START

504 — Generate a plurality of lidar inputs based on the lidar data

508 — Generate a plurality of bounding boxes based on the lidar inputs

512 — Determine one or more dimensional characteristics associated with the bounding boxes 516 — Perform an intersection over union routine to determine an overlap between each bounding box and one or more ground truth bounding boxes 520 — Determine the confidence score based on the overlap of the joined boxes 524 — Perform a non-maximum suppression routine based on the confidence scores to select one or more target bounding boxes 528 — Identify one or more objects based on the target bounding boxes

END

FIG. 5

SYSTEMS AND METHODS FOR DETECTING OBJECTS BASED ON LIDAR DATA

CROSS-REFERENCE TO RELATED APPLICATION

This application claims priority to and the benefit of U.S. Provisional Patent Application No. 63/387,154, filed Dec. 13, 2022. The disclosure of the above application is incorporated herein by reference in its entirety.

FIELD

The present disclosure relates to systems and methods for detecting objects based on lidar data.

BACKGROUND

The statements in this section merely provide background information related to the present disclosure and may not constitute prior art.

Autonomous and semi-autonomous vehicles employ light detection and ranging (lidar) sensors to detect objects in an environment surrounding the vehicle and to perform localization routines, such as a driver assistance routine, an adaptive cruise control routine, a braking routine, and/or an object detection routine. As an example, a vehicle control module may perform region-based convolutional neural network (R-CNN) routines to estimate region proposals associated with surrounding objects, such as a region proposal network. However, conventional R-CNN routines may generate a plurality of bounding boxes for a single object, thereby inhibiting the accuracy of the R-CNN routines and increasing the time and computing resources that are employed for performing the R-CNN routines.

SUMMARY

This section provides a general summary of the disclosure and is not a comprehensive disclosure of its full scope or all of its features.

The present disclosure provides a method for detecting one or more objects based on lidar data obtained from a lidar sensor of a vehicle. The method includes generating a plurality of lidar inputs based on the lidar data and performing, for each lidar input from among the plurality of lidar inputs, a convolutional neural network (CNN) routine to generate a plurality of bounding boxes based on the lidar inputs, determine one or more dimensional characteristics associated with each of the plurality of bounding boxes, and generate a confidence score associated with each of the plurality of bounding boxes. The method includes selecting one or more target bounding boxes from among the plurality of bounding boxes based on the confidence score associated with each of the plurality of bounding boxes and identifying the one or more objects based on the one or more target bounding boxes.

The following paragraph includes variations of the method of the above paragraph, which may be implemented individually or in any combination.

In one form, each lidar input from among the plurality of lidar inputs comprises an image-based portion and a point cloud-based portion; the image-based portion defines a pixel value and at least one of a light intensity value associated with the pixel coordinate, a surface reflectance value associated with the pixel coordinate, and an ambient light value associated with the pixel coordinate; the one or more dimensional characteristics associated with each of the plurality of bounding boxes include at least one of a center point of a given bounding box from among the plurality of bounding boxes, a length of the bounding box, a width of the bounding box, and a yaw angle of the bounding box; the confidence score indicates a likelihood of a given bounding box from among the plurality of bounding box surrounding a given object from among the one or more objects; generating the confidence score further comprises performing an Intersection over Union (IoU) routine to determine an overlap between the given bounding box and one or more ground truth bounding boxes associated with the one or more objects, and where the confidence score is based on the overlap; selecting the one or more target bounding boxes further comprises performing a non-maximum suppression (NMS) routine based on the confidence score associated with each of the plurality of bounding boxes; the method further includes iteratively performing the NMS routine until the one or more target bounding boxes do not overlap; and/or identifying the one or more objects based on the one or more target bounding boxes further comprises: identifying one or more ground truth bounding boxes based on the one or more dimensional characteristics associated with each of the one or more target bounding boxes, and classifying, for each object from among the one or more objects, the object based on the one or more ground truth bounding boxes.

The present disclosure provides a system for detecting one or more objects based on lidar data obtained from a lidar sensor of a vehicle. The system includes one or more processors and one or more nontransitory computer-readable mediums storing instructions that are executable by the one or more processors. The instructions include generating a plurality of lidar inputs based on the lidar data and performing, for each lidar input from among the plurality of lidar inputs, a convolutional neural network (CNN) routine to generate a plurality of bounding boxes based on the lidar inputs, determine one or more dimensional characteristics associated with each of the plurality of bounding boxes, and generate a confidence score associated with each of the plurality of bounding boxes. The instructions include selecting one or more target bounding boxes from among the plurality of bounding boxes based on the confidence score associated with each of the plurality of bounding boxes and identifying the one or more objects based on the one or more target bounding boxes.

The following paragraph includes variations of the system of the above paragraph, which may be implemented individually or in any combination.

In one form, each lidar input from among the plurality of lidar inputs comprises an image-based portion and a point cloud-based portion; the image-based portion defines a pixel value and at least one of a light intensity value associated with the pixel coordinate, a surface reflectance value associated with the pixel coordinate, and an ambient light value associated with the pixel coordinate; the one or more dimensional characteristics associated with each of the plurality of bounding boxes include at least one of a center point of a given bounding box from among the plurality of bounding boxes, a length of the bounding box, a width of the bounding box, and a yaw angle of the bounding box; the confidence score indicates a likelihood of a given bounding box from among the plurality of bounding box surrounding a given object from among the one or more objects; the instructions for generating the confidence score further comprise performing an Intersection over Union (IoU) routine to determine an overlap between the given bounding box and one or more ground truth bounding boxes associated with the one or more objects, and where the confidence score is based on the overlap; the instructions for selecting the one or more target bounding boxes further comprises performing a non-maximum suppression (NMS) routine based on the confidence score associated with each of the plurality of bounding boxes; the instructions further include iteratively performing the NMS routine until the one or more target bounding boxes do not overlap; and/or the instructions for identifying the one or more objects based on the one or more target bounding boxes further comprise: identifying one or more ground truth bounding boxes based on the one or more dimensional characteristics associated with each of the one or more target bounding boxes, and classifying, for each object from among the one or more objects, the object based on the one or more ground truth bounding boxes.

The present disclosure provides a method for detecting one or more objects based on lidar data obtained from a lidar sensor of a vehicle. The method includes generating a plurality of lidar inputs based on the lidar data and performing, for each lidar input from among the plurality of lidar inputs, a convolutional neural network (CNN) routine to generate a plurality of bounding boxes based on the lidar inputs, determine one or more dimensional characteristics associated with each of the plurality of bounding boxes, where the one or more dimensional characteristics associated with each of the plurality of bounding boxes include at least one of a center point of a given bounding box from among the plurality of bounding boxes, a length of the bounding box, a width of the bounding box, and a yaw angle of the bounding box, and generate a confidence score associated with each of the plurality of bounding boxes. The method includes performing a non-maximum suppression (NMS) routine to select one or more target bounding boxes from among the plurality of bounding boxes based on the confidence score associated with each of the plurality of bounding boxes and identifying the one or more objects based on the one or more target bounding boxes.

The following paragraph includes variations of the method of the above paragraph, which may be implemented individually or in any combination.

In one form, the confidence score indicates a likelihood of a given bounding box from among the plurality of bounding box surrounding a given object from among the one or more objects, and generating the confidence score further comprises performing an Intersection over Union (IoU) routine to determine an overlap between the given bounding box and one or more ground truth bounding boxes associated with the one or more objects, and where the confidence score is based on the overlap.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a flowchart of an example routine for detecting one or more objects based on lidar data in accordance with the teachings of the present disclosure; and FIG. 5 is a flowchart of an example routine for detecting one or more objects based on lidar data in accordance with the teachings of the present disclosure.

Figure 1:
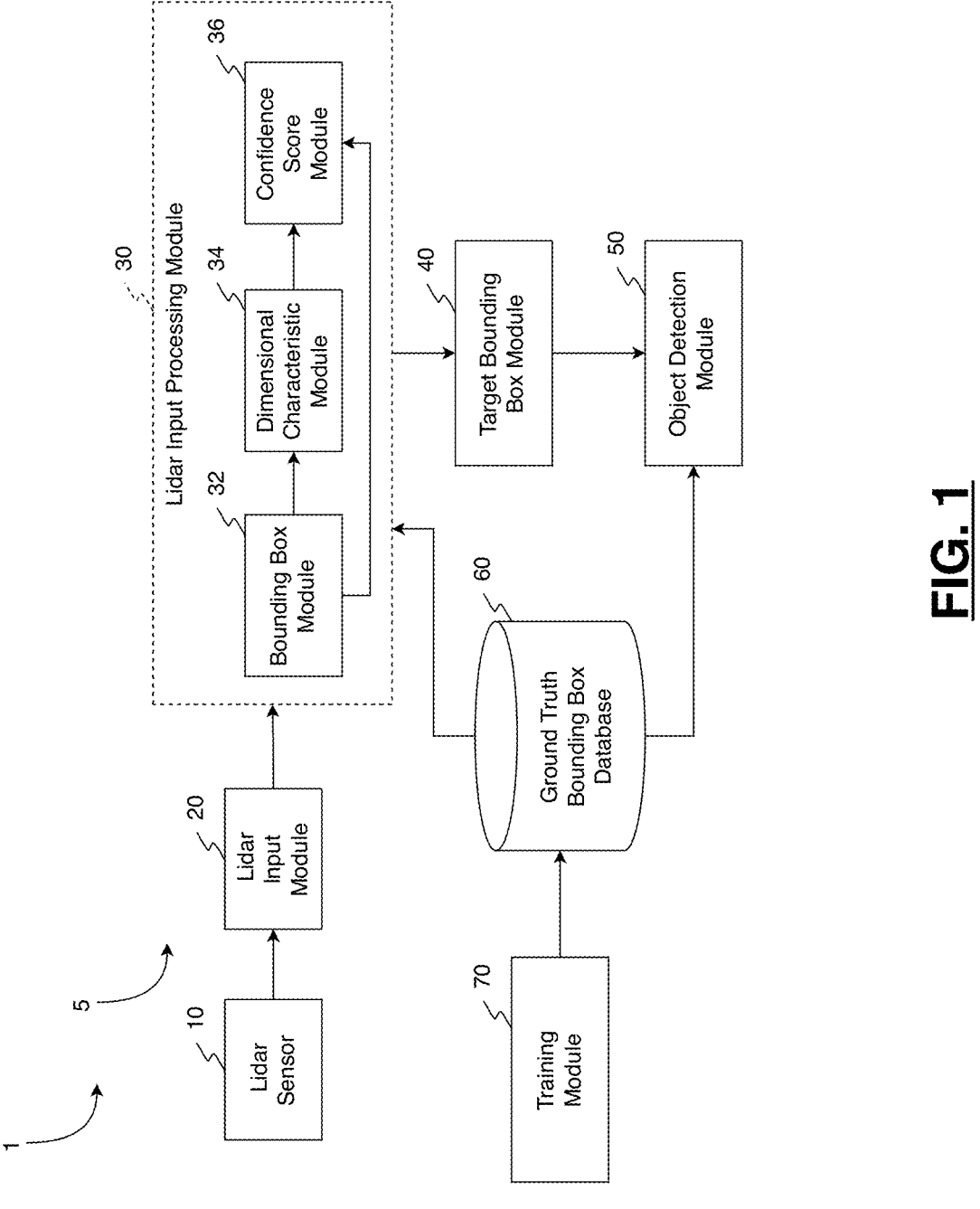
FIG. 1 is a functional block diagram of an example vehicle in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for detecting one or more objects based on lidar data. As described herein in further detail, a lidar input module generates lidar inputs based on the lidar data, and a lidar input processing module performs a convolutional neural network (CNN) routine to generate a plurality of bounding boxes based on the lidar inputs, determine one or more dimensional characteristics associated with each of the plurality of bounding boxes, and generate a confidence score associated with each of the plurality of bounding boxes. A target bounding box module selects one or more target bounding boxes from among the plurality of bounding boxes by performing a non-maximum suppression (NMS) routine, and an object detection module identifies one or more objects based on the one or more target bounding boxes. As such, the systems and methods described herein inhibit the presence of redundant and/or incorrectly generated bounding boxes associated with the objects surrounding, for example, a vehicle. Moreover, the systems and methods described herein improve the accuracy of the object detection routines performed by the R-CNN and inhibit the time and computing resources employed by the R-CNN to perform the object detection routines.

Referring to FIG. 1, an object detection system 5 of a vehicle 1 is provided and generally includes one or more lidar sensors 10, a lidar input module 20, a lidar input processing module 30, a target bounding box module 40, an object detection module 50, a ground truth bounding box database 60, and a training module 70. It should be readily understood that any one of the components of the object detection system 5 can be provided within the vehicle 1 or distributed at different locations that are external of the vehicle 1 (e.g., via one or more edge computing devices, such as an infrastructure-based computing device) and communicably coupled via a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). In one form, the components of the object detection system 5 are communicably coupled using a wired communication protocol (e.g., a control system area network (CAN) bus, a local interconnect network (LIN) bus, and/or a clock extension peripheral interface (CXPI) bus).

In one form, the one or more lidar sensors 10 detect contours and ranges of various objects in an environment surrounding the vehicle 1. As an example, the one or more lidar sensors 10 may include a laser system that emits a laser and a photodetector system that obtains various reflection metrics associated with one or more reflected signals associated with the objects in the surrounding environment, such as a timestamp associated with the reflected signals, a light intensity value that is based on a luminosity of the environment surrounding the vehicle, a surface reflectance value that is based on a signal strength of the reflected signals, and an ambient light value. In one form, the one or more lidar sensors 10 are provided by a single photon avalanche diode (SPAD)-based lidar sensor, but it should be understood that the one or more lidar sensors 10 may be provided by any type of lidar sensor.

Figure 2:
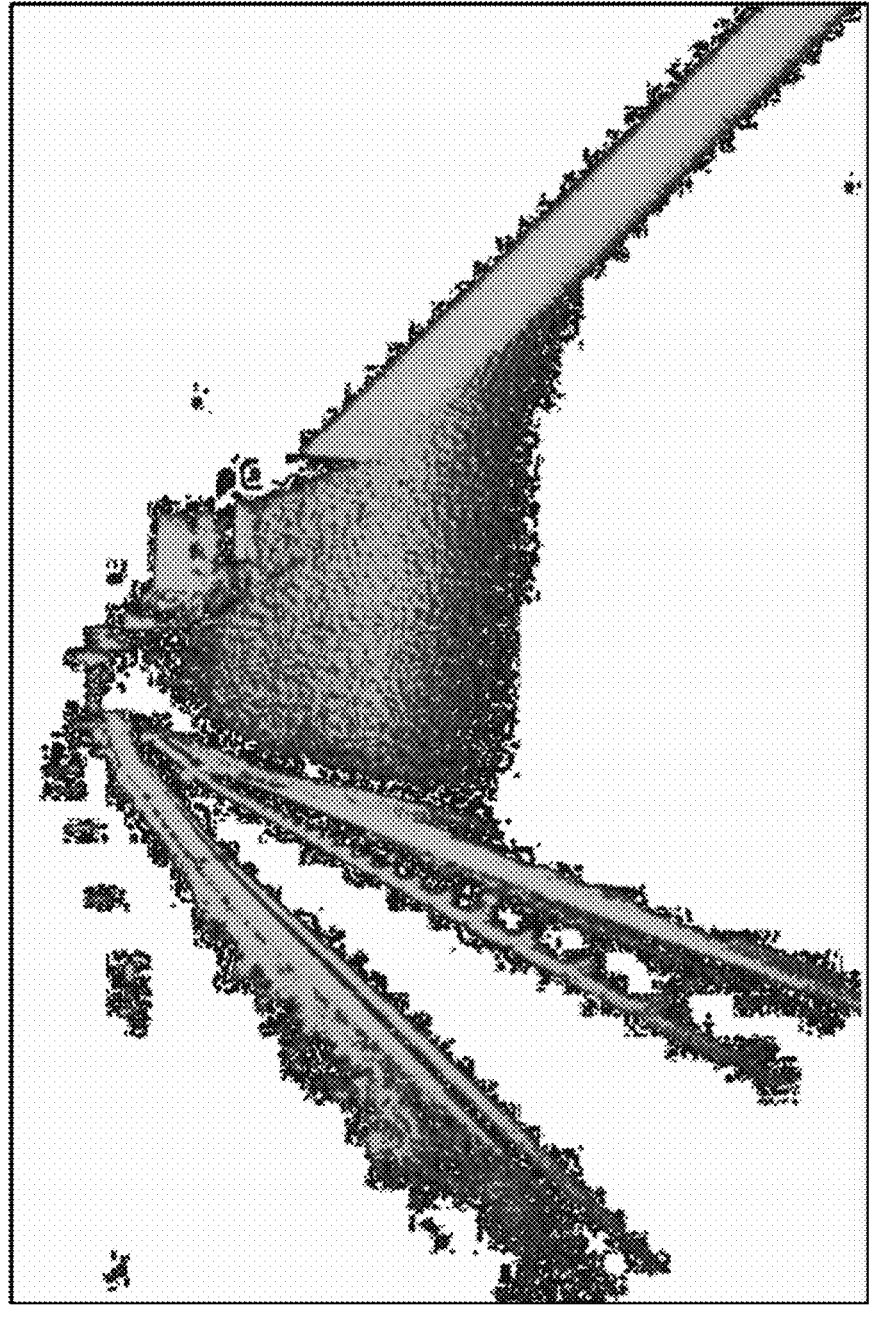
FIG. 2 illustrates an example lidar input in accordance with the teachings of the present disclosure.

In one form, the lidar input module 20 generates a plurality of lidar inputs based on the lidar data obtained by the one or more lidar sensors 10. Each lidar input may include an image-based portion and a point cloud-based portion. As an example, the point cloud-based portion may be a lidar-based intensity map comprising a plurality of lidar data points that define a position coordinate relative to a predefined origin (e.g., the one or more lidar sensors 10, a predefined reference point of the object detection system 5, among others), such as a Cartesian coordinate. Furthermore, each of the lidar data points may correspond to an edge, contour, or surface of a detected object surrounding the object detection system 5. To generate the point-cloud based portion, the lidar input module 20 may include a multilayer perceptron network (e.g., a PointNet++ neural network or other known open-source projects) configured to perform the functionality described herein. Additional details regarding the multilayer perceptron network are disclosed in U.S. patent application Ser. No. 17/708,745 titled "SYSTEMS AND METHODS FOR DETECTING OBJECTS BASED ON LIDAR DATA," which is commonly owned with the present application and the contents of which are incorporated herein by reference in its entirety. As another example and referring to FIG. 2, an image-based portion 80 may comprise image data comprising a plurality of pixel coordinates that correspond to the environment surrounding the object detection system 5. Furthermore, each pixel coordinate of the image data may further define at least one of a light intensity value, a surface reflectance value, and an ambient light value.

In one form, the lidar input module 20 is configured to perform one or more augmentation routines on the lidar inputs, such as a translation routine, a rotation routine, a scaling routine, a flipping routine, and/or a noise augmentation routine. As used herein, the "translation routine" refers to shifting at least one of an X-coordinate, a Y-coordinate, and a Z-coordinate of the point cloud-based portion. As used herein, the "rotation routine" refers to rotating at least one of an X-coordinate, a Y-coordinate, and a Z-coordinate of the radar data points of the point cloud-based portion by a respective angular value. As used herein, the "scaling routine" refers to multiplying at least one of an X-coordinate, a Y-coordinate, and a Z-coordinate of the point cloud-based portion by a respective scaling value. As used herein, the "flipping routine" refers to adjusting a sign of at least one of an X-coordinate, a Y-coordinate, and a Z-coordinate of the point cloud-based portion. It should be understood that the augmentation routine may be provided by other known augmentation routines and are not limited to the examples described herein.

In one form, the lidar input processing module 30 includes a bounding box module 32, a dimensional characteristic module 34, and a confidence score module 36. The modules of the lidar input processing module 30 may be provided by a convolutional neural network (CNN), such as a region-based convolutional neural network (R-CNN) (e.g., a region proposal network (RPN), a Faster R-CNN, or a Mask R-CNN), to perform the functionality described herein. While CNN routines are described herein, it should be understood that the lidar input processing module 30 may be replaced with other deep learning networks, systems, and/or modules configured to perform the morphological operations described herein, such as a computer vision system.

In one form, the bounding box module 32 of the lidar input processing module 30 generates a plurality of bounding boxes (e.g., two-dimensional or three-dimensional bounding boxes) based on the lidar inputs. As an example, the bounding box module 32 is provided by one or more convolutional layers and one or more pooling layers that iteratively perform a convolution and pooling routine, respectively, to initially extract one or more lidar-based features based on the lidar input. The one or more lidar-based features may be vectors that represent, for example, whether a given portion of the lidar input corresponds to an edge or contour of an object surrounding the object detection system 5. Subsequently, the bounding box module 32 may perform known semantic segmentation routines to identify edges/contours based on the one or more lidar-based features and known bounding box generation routines to generate the bounding boxes that surround the detected objects. To perform the functionality described herein, the one or more convolutional layers of the bounding box module 32 may be defined by any suitable combination of parameters including, but not limited to, weights, kernel dimensions, number of kernels, stride values, padding values, input/output channels, bit depths, and/or rectified linear unit (ReLU) activation layers. Furthermore, the one or more pooling layers of the bounding box module 32 may be defined by any suitable combination of parameters including, but not limited to, the type of pooling routine (e.g., a maximum pooling routine, an average pooling routine, an L2-norm pooling routine, among others), kernel dimensions, and/or sliding values.

The dimensional characteristic module 34 determines one or more dimensional characteristics associated with each of the bounding boxes generated by the bounding box module 32. The dimensional characteristics may include, but are not limited to, a center point of a given bounding box from among the plurality of bounding boxes, a length of the bounding box, a width of the bounding box, a yaw angle of the bounding box, a volume of the bounding box, and/or an area of the bounding box. As an example, the dimensional characteristic module 34 may perform known image processing routines (e.g., a difference-based image processing routine, a semantic-based image processing routine, pixel conversion routines, among others) to determine the one or more dimensional characteristics.

The confidence score module 36 is configured to generate a confidence score associated with each bounding box, and the confidence score indicates a likelihood of a given bounding box surrounding a given object surrounding the object detection system 5. In one form, the confidence score module 36 may perform an Intersection over Union (IoU) routine to determine an overlap between each bounding box and one or more ground truth bounding boxes stored in the ground truth bounding box database 60. Each of the one or more ground truth bounding boxes are associated with various objects that may surround the vehicle 1. To perform the functionality described herein, the training module 70 may perform known training routines to generate the ground truth bounding boxes associated with objects that may surround the vehicle 1 (e.g., person, another vehicle, a bicyclist, traffic infrastructure, among other objects that may be proximate to and/or surround a vehicle), define the dimensional characteristics of the ground truth bounding boxes, and store the ground truth bounding boxes in the ground truth bounding box database 60.

As an example, for a given bounding box, the confidence score module 36 may identify a corresponding ground truth bounding box stored in the ground truth bounding box database 60 having substantially similar dimensional characteristics as the given bounding box. Subsequently, the confidence score module 36 may perform a union operation to join the given bounding box with the identified ground truth bounding box and determine an overlap of the joined bounding boxes. As used herein, "overlap of the joined boxes" refers to a normalized value (e.g., between 0 and 1) indicating a matching between the dimensional characteristics of the bounding box and the ground truth bounding box. Accordingly, a higher overlap of the joined boxes may be associated with a higher confidence score (i.e., the bounding box has a higher likelihood of containing an object), and a lower overlap of the joined boxes may be associated with a lower confidence score. That is, an overlap value of 1 indicates a match between a center point, a length, a width, and/or a yaw angle of the bounding boxes.

In some forms, multiple confidence scores may be generated for each bounding box, and each of the confidence scores of a given bounding box may be associated with a given dimensional characteristic from among the plurality of dimensional characteristic (e.g., a first confidence score of a given bounding box indicates a match between center points, a second confidence score of a given bounding box indicates a match between lengths, etc.). Accordingly, the confidence score module 36 may aggregate each of the multiple confidence scores by performing various arithmetic routines (e.g., obtaining a minimum, maximum, average, etc.) to determine the overlap of the joined boxes/confidence score.

In one form, the target bounding box module 40 is configured to select one or more target bounding boxes from among the plurality of bounding boxes generated by the lidar input processing module 30 based on the confidence score associated with each of the bounding boxes. As an example, the target bounding box module 40 may perform a non-maximum suppression (NMS) routine based on the confidence scores of the plurality of bounding boxes to select the one or more target bounding boxes.

Figure 3:
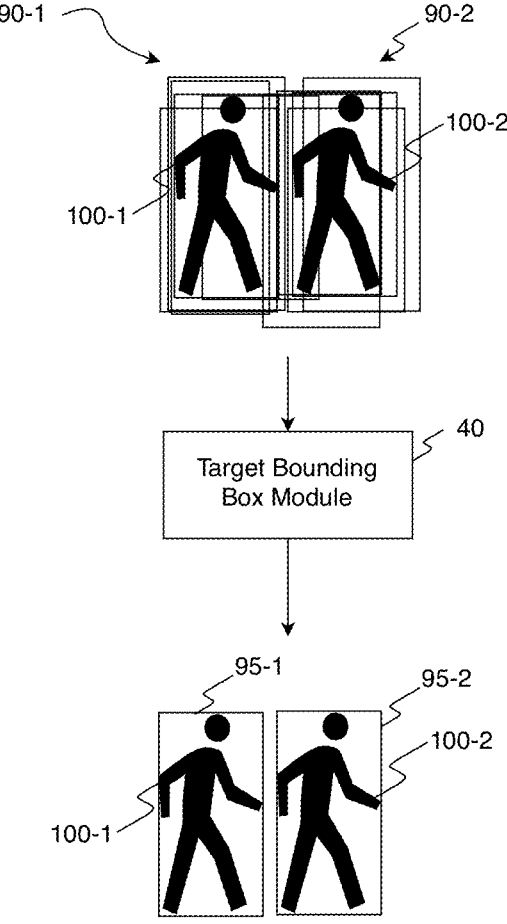
FIG. 3 illustrates example target bounding boxes in accordance with the teachings of the present disclosure.

As a more specific example, and referring to FIGS. 1 and 3, the lidar input processing module 30 may generate a plurality of bounding boxes 90-1, 90-2 (collectively referred to hereinafter as "bounding boxes 90") associated with objects 100-1, 100-2 (collectively referred to hereinafter as "objects 100"), respectively. The target bounding box module 40 then performs the NMS routine by initially assigning a bounding box having the highest confidence score from among the bounding boxes 90 to a testing category and assigning the remaining bounding boxes 90 to a proposal category. Subsequently, the target bounding box module 40 performs an Intersection over Union (IoU) routine to determine an NMS overlap between the selected bounding box (i.e., the bounding box of the testing category) and the remaining set of bounding boxes 90 (i.e., the bounding boxes of the proposal category). As used herein, "NMS overlap" refers to a normalized value (e.g., between 0 and 1) indicating a matching between the dimensional characteristics of the selected bounding box and the bounding boxes of the proposal category.

The target bounding box module 40 then discards the bounding boxes 90 from the proposal category when the associated NMS overlap is greater than an NMS threshold value (e.g., 0.7), which may be defined based on a number of anchor boxes of the lidar input, a resolution of the lidar sensor 10, and/or other parameters of the object detection system 5. The target bounding box module 40 may iteratively repeat/perform the NMS routine until the remaining one or more target bounding boxes do not overlap, as shown by target bounding boxes 95-1, 95-2. While FIG. 3 illustrates the NMS routine being performed on a two-dimensional bounding boxes 90, it should be understood that the NMS routine may be performed in a similar manner when the bounding boxes 90 are provided by three-dimensional bounding boxes 90.

In one form, the object detection module 50 identifies the one or more objects 100 based on the target bounding boxes 95. As an example, the object detection module 50 may perform known classification routines to identify the one or more corresponding ground truth bounding boxes and the associated object stored in the ground truth bounding box database 60 based on the one or more dimensional characteristics associated with the target bounding boxes 95. More specifically, the object detection module 50 may perform known classification routines to identify/categorize the objects 100 associated with the target bounding boxes 95 as pedestrians. As such, the accuracy and efficiency of the object detection routines performed by the object detection system 5 is improved due to the removal of redundant and potentially inaccurate bounding boxes 90 by the target bounding box module 40.

Referring to FIG. 4, a flowchart illustrating an example routine 400 for method for detecting one or more objects based on the lidar data is shown. At 404, the lidar input module 20 generates a plurality of lidar inputs based on the lidar data obtained by the one or more lidar sensors 10. At 408, the lidar input processing module 30 generates a plurality of bounding boxes based on the lidar inputs. At 412, the lidar input processing module 30 determines one or more dimensional characteristics associated with the bounding boxes, and the lidar input processing module 30 generates a confidence score associated with each of the bounding boxes at 416. At 420, the target bounding box module 40 selects one or more target bounding boxes based on the confidence scores, and the object detection module 50 identifies one or more objects based on the target bounding boxes at 424.

Referring to FIG. 5, a flowchart illustrating an example routine 500 for method for detecting one or more objects based on the lidar data is shown. At 504, the lidar input module 20 generates a plurality of lidar inputs based on the lidar data obtained by the one or more lidar sensors 10. At 508, the lidar input processing module 30 generates a plurality of bounding boxes based on the lidar inputs. At 512, the lidar input processing module 30 determines one or more dimensional characteristics associated with the bounding boxes. At 516, the lidar input processing module 30 performs an (IoU) routine to determine an overlap between each bounding box and one or more ground truth bounding boxes. At 520, the lidar input processing module 30 determines a confidence score associated with each of the bounding boxes based on the overlap of the joined boxes. At 524, the target bounding box module 40 performs the NMS routine based on the confidence scores to select one or more target bounding boxes, and the object detection module 50 identifies one or more objects based on the target bounding boxes at 528.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for detecting one or more objects based on lidar data obtained from a lidar sensor of a vehicle, the method comprising:
   generating a plurality of lidar inputs based on the lidar data;
   performing, for each lidar input from among the plurality of lidar inputs, a convolutional neural network (CNN) routine to:
      generate a plurality of bounding boxes based on the lidar inputs;
      determine one or more dimensional characteristics associated with each of the plurality of bounding boxes; and generate a confidence score associated with each of the plurality of bounding boxes, wherein generating the confidence score includes performing an Intersection over Union (IoU) routine to determine an overlap between each of the plurality of bounding boxes and one or more ground truth bounding boxes associated with the one or more objects, and generating the confidence score based on the overlap,
   wherein the overlap indicates a matching between the one or more dimensional characteristics of the bounding box and the ground truth bounding box, the one or more dimensional characteristics including one or more of a center point, a length, a width, and a yaw angle;
   selecting one or more target bounding boxes from among the plurality of bounding boxes based on the confidence score associated with each of the plurality of bounding boxes by iteratively performing a non-maximum suppression (NMS) routine based on the confidence score associated with each of the plurality of bounding boxes until the one or more target bounding boxes do not overlap; and
   identifying the one or more objects based on the selected one or more target bounding boxes.

2. The method of claim 1, wherein each lidar input from among the plurality of lidar inputs comprises an image-based portion and a point cloud-based portion.

3. The method of claim 2, wherein the image-based portion defines a pixel coordinate and at least one of a light intensity value associated with the pixel coordinate, a surface reflectance value associated with the pixel coordinate, and an ambient light value associated with the pixel coordinate.

4. The method of claim 1, wherein the confidence score indicates a likelihood of a given bounding box from among the plurality of bounding box surrounding a given object from among the one or more objects.

5. The method of claim 1, wherein identifying the one or more objects based on the one or more target bounding boxes further comprises:
   identifying the one or more ground truth bounding boxes based on the one or more dimensional characteristics associated with each of the one or more target bounding boxes; and classifying, for each object from among the one or more objects, the object based on the one or more ground truth bounding boxes.

6. A system for detecting one or more objects based on lidar data obtained from a lidar sensor of a vehicle, the system comprising:
   one or more processors and one or more non-transitory computer-readable mediums storing instructions that are executable by the one or more processors, wherein the instructions comprise:
   generating a plurality of lidar inputs based on the lidar data;
   performing, for each lidar input from among the plurality of lidar inputs, a convolutional neural network (CNN) routine to:
      generate a plurality of bounding boxes based on the lidar inputs,
      determine one or more dimensional characteristics associated with each of the plurality of bounding boxes, and
      generate a confidence score associated with each of the plurality of bounding boxes, wherein generating the confidence score includes performing an Intersection over Union (IoU) routine to determine an overlap between each of the plurality of bounding boxes and one or more ground truth bounding boxes associated with the one or more objects, and generating the confidence score based on the overlap, wherein the overlap indicates a matching between the one or more dimensional characteristics of the bounding box and the ground truth bounding box, the one or more dimensional characteristics including one or more of a center point, a length, a width, and a yaw angle;

selecting one or more target bounding boxes from among the plurality of bounding boxes based on the confidence score associated with each of the plurality of bounding boxes by iteratively performing a non-maximum suppression (NMS) routine based on the confidence score associated with each of the plurality of bounding boxes until the one or more target bounding boxes do not overlap; and identifying the one or more objects based on the selected one or more target bounding boxes.

7. The system of claim 6, wherein each lidar input from among the plurality of lidar inputs comprises an image-based portion and a point cloud-based portion.

8. The system of claim 7, wherein the image-based portion defines a pixel coordinate and at least one of a light intensity value associated with the pixel coordinate, a surface reflectance value associated with the pixel coordinate, and an ambient light value associated with the pixel coordinate.

9. The system of claim 6, wherein the confidence score indicates a likelihood of a given bounding box from among the plurality of bounding box surrounding a given object from among the one or more objects.

10. The system of claim 6, wherein the instructions for identifying the one or more objects based on the one or more target bounding boxes further comprise:

identifying one or more ground truth bounding boxes based on the one or more dimensional characteristics associated with each of the one or more target bounding boxes; and classifying, for each object from among the one or more objects, the object based on the one or more ground truth bounding boxes.

\* \* \* \* \*